United States Patent Office 2,895,972
Patented July 21, 1959

2,895,972
METHOD OF MAKING 21-F$\Delta^{1,4}$ PREGNADIENE COMPOUNDS

Josef Fried and Josef E. Herz, New Brunswick, N.J., assignors to Olin Mathieson Chemical Corporation, New York, N.Y., a corporation of Virginia No Drawing. Application July 18, 1956
Serial No. 598,539

4 Claims. (Cl. 260—397.45)

This invention relates to the synthesis of steroids and has for its objects the provision of (I) an advantageous process of preparing the new steroids: 21-fluoro-$\Delta^{1,4}$-pregnadiene-11$\beta$,17$\alpha$-diol-3,20-dione and 21-fluoro-$\Delta^{1,4}$-pregnadiene-17$\alpha$-ol-3,11,20-trione; and (II) these new steroids, which are useful in themselves as physiologically active steroids.

The process of this invention essentially comprises interacting a 21-alkanesulfonic acid ester of $\Delta^{1,4}$-pregnadiene-11$\beta$,17$\alpha$,21-triol-3,20-dione or $\Delta^{1,4}$-pregnadiene-17$\alpha$,21-diol-3,11,20-trione or the corresponding 21-chloro, bromo or iodo derivatives (e.g., 21-chloro-$\Delta^{1,4}$-pregnadiene-11$\beta$,17$\alpha$-diol-3,20-dione) with potassium fluoride to form the corresponding 21-fluoro derivatives, and, if an 11-keto final product is desired and an 11$\beta$-hydroxy steroid is employed as the initial reactant, oxidizing the resultant 11$\beta$-hydroxy steroid to its 11-keto derivative.

Suitable starting materials utilizable in the process of this invention include the 21-alkanesulfonic acid esters (particularly the lower alkanesulfonic acid esters, as exemplified by the methanesulfonic acid ester) of $\Delta^{1,4}$-pregnadiene-11$\beta$,17$\alpha$,21-triol-3,20-dione and $\Delta^{1,4}$-pregnadiene-17$\alpha$,21-diol-3,11,20-trione; 21-chloro - $\Delta^{1,4}$ - pregnadiene-11$\beta$,17$\alpha$-diol-3,20-dione; 21-chloro-$\Delta^{1,4}$-pregnadiene-17$\alpha$-ol-3,11,20-trione; 21-bromo - $\Delta^{1,4}$ - pregnadiene - 11$\beta$, 17$\alpha$-diol-3,20-dione; 21-bromo-$\Delta^{1,4}$-pregnadiene - 17$\alpha$ - ol-3,11,20-trione; 21-iodo-$\Delta^{1,4}$ - pregnadiene - 11$\beta$,17$\alpha$ - diol-3,20-dione; and 21-iodo-$\Delta^{1,4}$-pregnadiene-17$\alpha$-ol-3,11,20-trione. In accordance with the process of this invention, one of these starting materials is interacted with potassium fluoride. This reaction is preferably conducted in an organic solvent of high dielectric constant, such as dimethylformamide, dimethylsulfoxide, and diethylene glycol, optimally at an elevated temperature, such as one in the range of about 100° C. to about 130° C.

If an 11$\beta$-hydroxy steroid is employed as the starting material and an 11-keto final product is desired, the resulting 21-fluoro-11$\beta$-hydroxy steroid can then be oxidized in the usual manner as by treating with a hexavalent chromium compound (e.g., chromic acid) in an acidic medium (e.g., glacial acetic acid) to yield the corresponding 11-keto derivative.

The 21-fluoro steroids of the $\Delta^{1,4}$-pregnadiene series of this invention are physiologically active steroids which possess glucocorticoid activity. Thus, these new steroids of this invention can be administered instead of, and in the same manner as, cortisone or hydrocortisone in the treatment of rheumatoid arthritis and/or dermatomyositis. The dosage for such administration is, of course, dependent on the relative activity of the compound.

The following examples are illustrative of the invention (all temperatures being in centigrade):

EXAMPLE 1

*21-fluoro-$\Delta^{1,4}$-pregnadiene-11$\beta$,17$\alpha$-diol-3,20-dione and $\Delta^{1,4}$-pregnadiene-17$\alpha$,21-oxido-11$\beta$-ol-3,20-dione*

(*a*) PREPARATION OF $\Delta^{1,4}$-PREGNADIENE-11$\beta$,17$\alpha$,21-TRIOL-3,20-DIONE 21-MESYLATE To a solution of 2.0 g. of $\Delta^{1,4}$-pregnadiene-11$\beta$,17$\alpha$,21-triol-3,20-dione in 24 ml. of anhydrous pyridine is added at 0° 1.05 ml. of methanesulfonyl chloride and the mixture allowed to remain at 0° for 2.5 hours. Ice water is added carefully and the resulting crystalline precipitate filtered off and washed with water. The crude precipitate (about 2.22 g.) is used in the next step without further purification. An analytical sample prepared by recrystallization from 95% alcohol melts at about 200° (dec.), $[\alpha]_D^{23}$ +106° (c., 0.55 in 95% alcohol);

$\lambda_{max}^{Nujol}$ 2.82, 3.02, 5.76, 6.01, 6.19, 6.24$\mu$

Analysis.—Calcd. for $C_{22}H_{30}O_7S$: C, 60.26; H, 6.90. Found: C, 60.21; H, 6.89.

(*b*) REACTION OF $\Delta^{1,4}$-PREGNADIENE-11$\beta$,17$\alpha$,21-TRIOL-3,20-DIONE 21-MESYLATE WITH POTASSIUM FLUORIDE A solution of 1 g. of $\Delta^{1,4}$-pregnadiene-11$\beta$,17$\alpha$,21-triol-3,20-dione 21-mesylate and 1.0 g. of anhydrous potassium fluoride in 50 ml. of dimethylsulfoxide is heated at 110° with stirring for 24 hours. After cooling, the mixture is diluted with ice water and the resulting precipitate (about 570 mg.) filtered off and washed with water. The precipitate is separated by extraction with hot chloroform into the chloroform-insoluble 21-fluoride and the chloroform-soluble 17$\alpha$,21-epoxide. The 21-fluoride-$\Delta^{1,4}$-pregnadiene-11$\beta$,17$\alpha$-diol-3, 20-dione, on recrystallization from acetone, has the following properties: M.P. about 257–262°; $[\alpha]_D^{23}$ +86° (c., 0.31 in dioxane);

$\lambda_{max}^{alc.}$ 243 m$\mu$ ($\epsilon$=15,100); $\lambda_{max}^{Nujol}$ 2.90, 3.00, 5.74, 6.04, 6.21, 6.26$\mu$ Analysis.—Calcd. for $C_{21}H_{27}O_4F$ (362.42): C, 69.59; H, 7.50; F, 5.24. Found: C, 69.76; H, 7.42; F, 4.92.

The chloroform soluble fraction (about 365 mg.) is dissolved in 4 ml. of chloroform and 8 ml. of benzene and chromatographed in 7.3 g. of acid-washed alumina. A mixture of 1 part chloroform and 2 parts benzene (450 ml.) elutes about 220 mg. of the $\Delta^{1,4}$-pregnadiene-17$\alpha$,21-oxido-11$\beta$-ol-3,20-dione, which after recrystallization from 95% alcohol has the following properties: M.P. about 243-244°; $[\alpha]_D^{23}$ +182° (c., 0.48 in CHCl$_3$);

$\lambda_{max}^{alc.}$ 243 m$\mu$ ($\epsilon$=15,400); $\lambda_{max}^{Nujol}$ 2.99, 5.53, 6.03, 6.20, 6.26$\mu$ Analysis.—Calcd. for $C_{21}H_{26}O_4$ (342.42): C, 73.66; H, 7.66. Found: C, 73.58; H, 7.48.

EXAMPLE 2

*21-fluoro-$\Delta^{1,4}$-pregnadiene-17$\alpha$-ol-3,11,20-trione*

To a solution of 100 mg. of 21-fluoro-$\Delta^{1,4}$-pregnadiene-11$\beta$,17$\alpha$-diol-3,20-dione in 5 ml. of glacial acetic acid is added a solution of 40 mg. of chromic acid in 4 ml. of acetic acid. A half-hour later, 0.5 ml. of methanol is added, and the resulting mixture is concentrated in vacuo. The residue is taken up in water, and extracted with ethyl acetate. After drying over sodium sulfate and evaporation of the solvent in vacuo, the residue is crystallized from 95% ethanol to give pure 21-fluoro-$\Delta^{1,4}$-pregnadiene-17α-ol-3,11,20-trione.

The invention may be otherwise variously embodied within the scope of the appended claims.

We claim:

1. A process for preparing a steroid selected from the group consisting of 21-fluoro-$\Delta^{1,4}$-pregnadiene-11β,17α-diol-3,20-dione and 21-fluoro-$\Delta^{1,4}$-pregnadiene-17α-ol-3,11,20-trione, which comprises interacting a steroid selected from the group consisting of the 21-(lower alkane) sulfonic acid esters of $\Delta^{1,4}$-pregnadiene-11β,17α,21-triol-3-20-dione and $\Delta^{1,4}$-pegnadiene-17α,21-diol-3,11,20-trione with potassium fluoride under substantially anhydrous conditions and recovering the resulting 21-fluoro steroid.

2. A process for preparing a steroid selected from the group consisting of 21-fluoro-$\Delta^{1,4}$-pregnadiene-11β,17α-diol-3,20-dione and 21-fluoro-$\Delta^{1,4}$-pregnadiene-17α-ol-3,11,20-trione, which comprises interacting a steroid selected from the group consisting of the 21-(lower alkane) sulfonic acid esters of $\Delta$1,4-pregnadiene-11β,17α,21-triol-3,20-dione and $\Delta^{1,4}$-pregnadiene-17α,21-diol-3,11,20-trione with potassium fluoride under substantially anhydrous conditions at an elevated temperature in an organic solvent of high dielectric constant, and recovering the resulting 21-fluoro steroid.

3. The process of claim 2 wherein the steroid reactant is a 21-methanesulfonic acid ester.

4. A process for preparing 21-fluoro-$\Delta^{1,4}$-pregnadiene-11β,17α-diol-3,20-dione which comprises interacting $\Delta^{1,4}$-pregnadiene-11β,17α,21-triol-3,20-dione 21-mesylate with potassium fluoride under substantially anhydrous conditions at an elevated temperature in an organic solvent of high dielectric constant, and recovering the resulting 21-fluoro steroid.

No references cited.